W. A. WARMAN.
POWER GENERATOR.
APPLICATION FILED DEC. 1, 1913.
1,183,784.
Patented May 16, 1916.
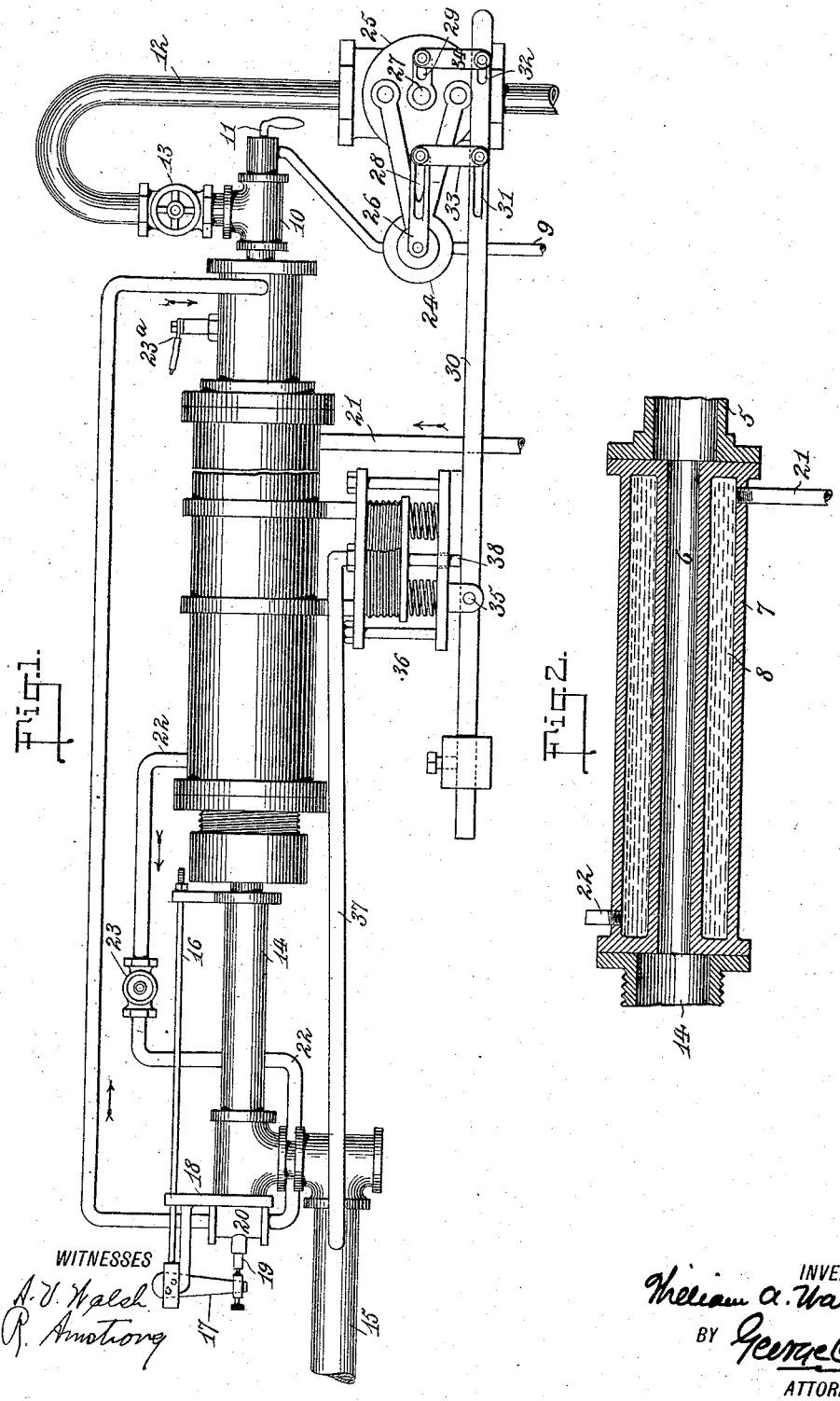
WITNESSES
A. V. Walsh
R. Armstrong
INVENTOR
William A. Warman
BY George Boch
ATTORNEYS

UNITED STATES PATENT OFFICE.

WILLIAM A. WARMAN, OF NEW YORK, N. Y., ASSIGNOR TO KELLER MECHANICAL ENGRAVING COMPANY, OF BROOKLYN, NEW YORK, A CORPORATION OF NEW YORK.

POWER-GENERATOR.

1,183,784.     Specification of Letters Patent.     Patented May 16, 1916.

Application filed December 1, 1913. Serial No. 803,933.

*To all whom it may concern:*

Be it known that I, WILLIAM A. WARMAN, a citizen of the United States, and a resident of New York, borough of Manhattan, in the county of Kings and State of New York, have made and invented certain new and useful Improvements in Power-Generators, of which the following is a specification.

My invention relates to an improvement in power generators, the object thereof being to provide a device of this character, so constructed and assembled, that a much greater efficiency may be obtained therefrom than has heretofore been the case; which will be so constructed and arranged that the supply of fuel and air to the combustion chamber will be automatically controlled in accordance with the pressure of the hot gases generated, and wherein the temperature of the gases may also be automatically controlled whereby to avoid any and all danger of the destruction of any of the parts by reason of the excessive heat generated in the combustion chamber.

With these and other ends in view the invention consists in certain novel features of construction and combinations of parts as will be hereinafter fully described and pointed out in the claims.

In the accompanying drawings, Figure 1 is a view in side elevation of a power generator constructed in accordance with my invention; Fig. 2 is a sectional view taken longitudinally through the water-jacketed combustion chamber.

Referring to the drawings, 5 represents a chamber, in the form of a receptacle, tube or cylinder, to one end of which is bolted or otherwise secured the cylinder 6, surrounded by the water-jacket 7, and forming the water chamber 8, the pipe, tube or cylinder 6 communicating with the chamber 5 and forming a continuation thereof, as clearly illustrated in Fig. 2 of the drawings.

Into the cylinder 5, forming a part of the combustion chamber, are led the fuel and air, the fuel being such as is ordinarily employed with internal combustion engines, as, for instance, gas, gasolene, oil, etc., and preferably under pressure, the fuel being supplied through the pipe 9 into a mixing chamber 10 connected with one end of the combustion chamber 5, this supply pipe being provided with a manually operated valve 11. To the mixing chamber 10 also leads the air supply pipe 12, this pipe being also provided with a manually operated valve 13, as illustrated in Fig. 1, this construction and arrangement of parts permitting the supply of fuel and air to the mixing chamber 10 to be regulated or controlled, these several valves being provided in addition to automatic valves hereinafter referred to.

To the outlet end of the combustion chamber 6 is secured a pipe, tube or cylinder 14, communicating with the outlet pipe 15 for conducting the hot gases to the engine (not shown), the latter being of any type or size as may be desired for utilizing the power generated. This tube, pipe or cylinder 14 which conducts the hot gases from the combustion chamber is formed of metal having a high co-efficient of expansion, as iron or brass, and has rigidly secured thereto one end of a rod 16, made of material having a low co-efficient of expansion, as, for instance, invar, the opposite end of this rod 16 being connected with a lever 17 fulcrumed in a bracket or support 18 rigidly connected with or to the expansion pipe 14, the lower end of said lever 17 being connected with the valve stem 19 of the valve 20, said valve 20 being also carried by the bracket or support 18, the several parts above mentioned comprising a thermostat to regulate the temperature of the gases flowing through the combustion chamber 7 and into the outlet pipe 15 as will be hereinafter described.

Into the chamber 8 leads a water supply pipe 21, and from said chamber leads the outlet pipe 22, the inlet pipe 21 being connected with any suitable sources of water supply, the outlet pipe 22 being provided in its length with a manually operated valve 23. Said outlet pipe is also connected with and controlled by the valve 20, from which latter the outlet pipe 22 leads into the combustion chamber 5, as illustrated in Fig. 1.

From the foregoing it will be understood that the fuel and air supplied through the pipes 9 and 12, and proportioned to give the proper combustible mixture, are mixed in the mixing chamber 10 and flow from the mixing chamber into the combustion chamber 5, where the mixture becomes ignited by the spark plug 23ª, or other suitable means, the ignited gas then flowing through the combustion chamber 6 and through the pipes 14 and 15 to the engine or other device employed for utilizing the power generator. As these hot gases pass through the tube or cylinder 14 the temperature thereof, if excessive, will expand the said tube 14, the result being that the non-expansible member 16 will so operate the lever 17 as to open the valve 20, and thus permit water to flow from the chamber 8 through the pipe 22, through the valve 20, through the pipe 22 leading from said valve 20, and into the combustion chamber 5, where it will mingle with the ignited gas to cool the same to the desired degree. After the proper temperature has been secured, the cooled gas flowing through the tube or cylinder 14 will permit of the contraction of the same, causing the valve 20 in the water pipe 22 to be closed, or partially so, and to so remain until an excessive temperature of the gases causes the valve 20 to automatically open and again supply the necessary quantity of water to the combustion chamber.

While I have above described the use of water as the cooling medium for maintaining the proper temperature in the combustion chamber, it will be understood without further description or illustration that the device is applicable for utilizing air or other gas as the cooling medium, the air being directed through the pipes 21, through the chamber 8, and out through the outlet pipe 22 into the combustion chamber 5, where it is mingled with the products of combustion in order to cool the latter, exactly as in the case where water is employed.

I have found in practice that this construction and arrangement of parts is a very desirable one in that the temperature of the working gases may be very accurately adjusted and retained, avoiding any and all danger of the burning or destruction of any of the parts of the device by the excessive heat generated; furthermore, by forming the thermostat as a part of the outlet pipe from the combustion chamber, all the parts thereof are easily and readily accessible for adjustment, and being exposed to the surrounding atmosphere no danger of destruction thereof by the heat of the gases exists.

In order to automatically control the supply of fuel and air to the combustion chamber in accordance with the pressure of the gases in the outlet pipe, and in order also to control the proper amount or supply of each to preserve the proper mixture for combustion, I provide in the fuel inlet pipe 9 a valve 24 and in the air supply pipe 12 a valve 25, the former having a lever 26 connected therewith, and the latter having a lever 27, each of said levers being provided at their outer free ends with an elongated slot 28, 29, respectively. Each of said levers 26 and 27 is linked to a lever 30, the latter being also provided with two elongated slots 31 and 32, whereby the link 33 connecting the lever 26 to the lever 30, and the link 34 connecting the lever 27 with the lever 30, may be so adjusted as to open and close the valves 24 and 25 to any extent desired with regard to the pressure of the gases in the outlet pipe 15, as will be hereinafter understood, and also to any extent as may be desired with relation to each other, in order that the proper relative quantities of the fuel and air may be supplied to the mixing chamber 10 as to preserve the proper combustible mixture. Once these valves have been set, no further attention to this is required.

The lever 30 is fulcrumed at 35 to a regulator 36, which may be of any approved style or pattern, as for instance, a diaphragm regulator, a piston regulator, a Bourdon spring, etc., this regulator being connected with the outlet pipe 15 by a pipe 37, the result being that when the gases flowing through the outlet 15 exert an excessive or too great a pressure, such pressure will be transmitted through the pipe 37 to the regulator 36, which, forcing the lever 30 downwardly by means of the rod 38 connected with the regulator and bearing against said lever, will cause the opposite end of said lever 30 to automatically close or partially close the valves 24 and 25 in the fuel and air supply pipes. When the pressure is released the lever 30 will again rise to its normal position, permitting the valves 24 and 25 to also assume their normal positions.

It will be seen that the combustion chamber 5 and the tube or cylinder 6 which communicates therewith are of relatively small capacity, so that no considerable volume of burning or burned gases is present in my device, the sustained pressure of the fluid under pressure produced being due to the continuous and uninterrupted supply of air and fuel to the combustion chamber; and it follows, because of the small capacity of the combustion chamber, that no considerable volume of unburned gases can accumulate within the device, as is possible in similar devices which make use of a comparatively large storage tank, which unburned gases if allowed to accumulate to any extent within the tank will presently be ignited and an explosion will follow which may wreck the device, and which at any rate will produce violent fluctuation of pressure difficult to deal with. In my device, however, no appreciable volume of unburned gases can accumulate, and no violent fluctuations or waves of pressure are met with when the same is in use; and, finally, such slight variations of pressure as may occur in the chamber in question are so damped, and reduced to such an extent, as to have but little if any effect upon the fuel and air controlling mechanism, because of the fact that the pipe 37 leading to said controlling mechanism communicates with the discharge or outlet pipe 15 at a point remote from the combustion chamber wherein such slight fluctuations of pressure as may occur in my device actually take place.

From the illustration, and from the above description, it will be understood that my improved generator is particularly simple in construction, of but few parts easily and readily accessible for adjustment and regulation, and wherein there is but little or no danger of getting out of order or being injured or destroyed by the hot gases; that the supply of combustible gas and the relative quantities of the fuel and air are automatically regulated by the pressure of the gases, and finally, that the temperature of the gases in the combustion chambers is also automatically regulated.

What I claim is:—

1. A power generator comprising a combustion chamber, means for supplying fuel thereto, means for supplying a cooling medium to said combustion chamber, and a thermostat located exterior to and connected with said chamber for controlling the supply of the cooling medium to the products of combustion.

2. A power generator comprising a combustion chamber, and means for supplying fuel thereto, means for supplying water to said chamber, and means located exterior to and connected with said chamber for controlling said water supply by the temperature of the burned fuel.

3. A power generator comprising a combustion chamber and means for supplying fuel thereto, means for supplying water to said chamber, and a thermostat for conducting the burned fuel therefrom and arranged to automatically control the water supply to said chamber by the temperature of the burned fuel.

4. A power generator comprising a combustion chamber and means for supplying a combustible fuel thereto, means for supplying water to the interior of said chamber, a thermostat located exterior to said chamber and in part forming an outlet for the latter, said thermostat being connected with and operating said means for supplying water to the interior of said chamber.

5. A power generator comprising a combustion chamber and means for supplying a combustible fuel thereto, means for supplying water to the interior of said chamber, a thermostat located exterior to said chamber and through which the burned fuel passes from the latter, and means operated by said thermostat for regulating the supply of water to said chamber.

6. A power generator comprising a combustion chamber and means for supplying fuel thereto, an expansible pipe connected with said chamber to lead the burned fuel therefrom, means for supplying water to the interior of said chamber, and means connected with said expansible pipe and with said water supply for controlling the latter by the expansion and contraction of said expansible pipe.

7. A power generator comprising a combustion chamber and means for supplying fuel thereto, a water chamber surrounding the combustion chamber, a pipe leading from the water chamber into the combustion chamber and provided with a valve, a thermostat located exteriorly to and connected with said combustion chamber and controlled by the temperature of the burned fuel, and also connected with and operating said valve.

8. In a power generator, a combustion chamber, an outlet pipe leading from said generator and through which the gases produced may flow, means for supplying fuel to said combustion chamber, and means operated by the pressure of the gases in said outlet pipe at a point remote from said combustion chamber for controlling the supply of fuel to said combustion chamber.

9. In a power generator, a combustion chamber, an outlet pipe leading from said generator and through which the gases produced may flow, air and fuel conduits through which air and fuel may be supplied to said combustion chamber, valve mechanism for controlling the flow through said conduits, and means dependent for its operation upon the pressure of the gases in said outlet conduit at a point remote from said combustion chamber for operating said valve mechanism.

10. In a power generator, a combustion chamber of relatively small capacity, a conduit leading from said generator and through which the gases produced may flow, a conduit through which fuel may be supplied to said combustion chamber, a valve for controlling the flow of fuel through said fuel conduit, a pressure operated regulating device for operating said fuel valve, and a pipe connecting said regulating device with said first mentioned conduit at a point remote from said combustion chamber.

11. In a power generator, a combustion chamber of relatively small capacity, an outlet pipe leading from said generator and through which the gases produced may flow, a fuel supply pipe through which fuel may flow to said combustion chamber, a valve for controlling the flow of fuel through said supply pipe, and means operated by the pressure of the gases in said outlet pipe and operatively connected with said fuel valve for controlling the supply fuel to said combustion chamber.

12. In a power generator, a combustion chamber of relatively small capacity, an outlet pipe leading from said generator and through which the fluid under pressure produced may flow, air and fuel supply pipes through which air and fuel may be supplied to said combustion chamber, valves adapted to control the flow through said air and fuel supply pipes, a pressure operated regulating device operatively connected with said valves to thereby control the supply of air and fuel to said combustion chamber, and a pipe connecting said regulating device with said outlet pipe at a point remote from said combustion chamber.

Signed at New York, borough of Manhattan, in the county of New York and State of New York, this 29th day of November, A. D. 1913.

WILLIAM A. WARMAN.

Witnesses:
A. V. WALSH,
A. N. SEAMAN.

Copies of this patent may be obtained for five cents each, by addressing the "Commissioner of Patents, Washington, D. C."